UNITED STATES PATENT OFFICE.

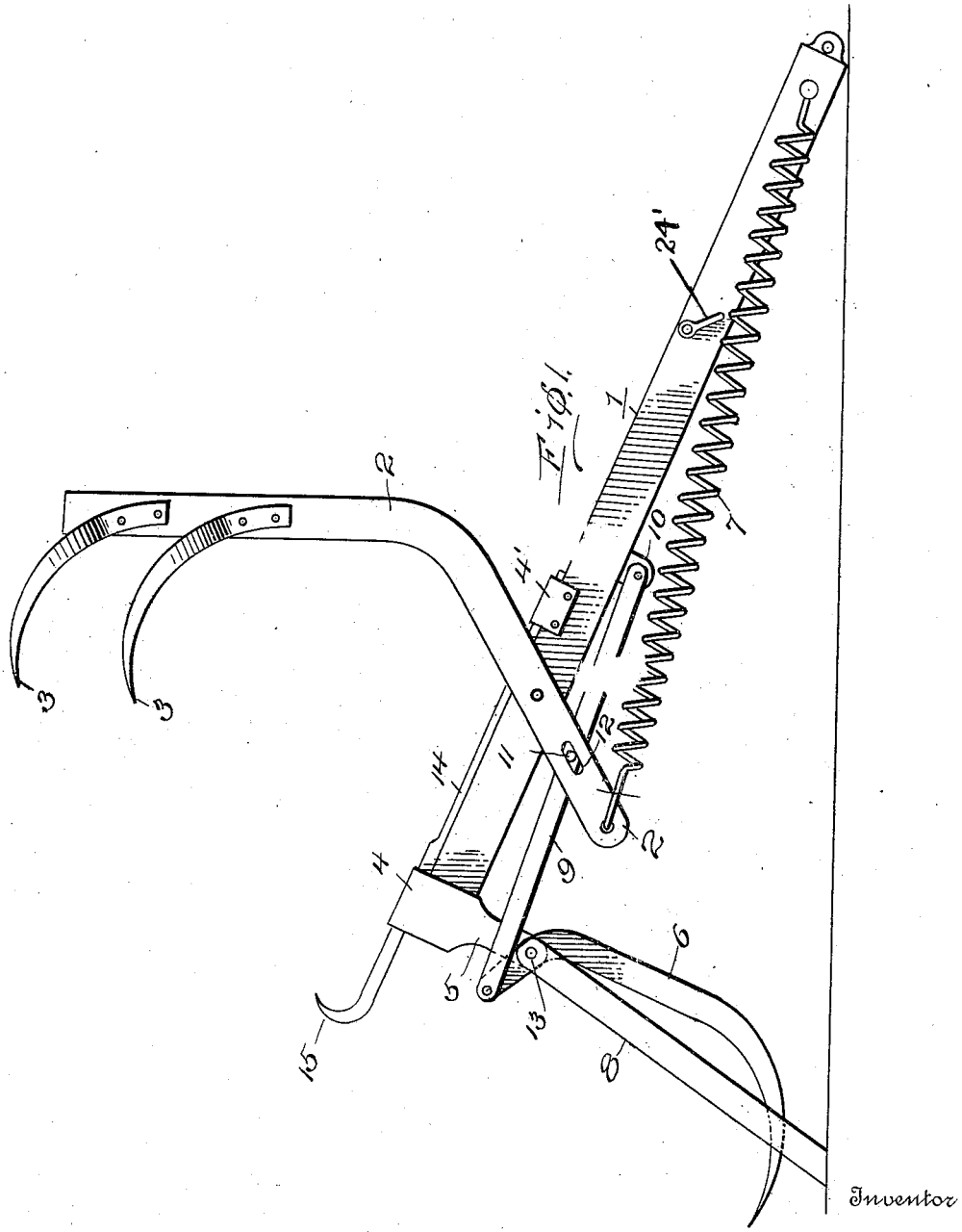

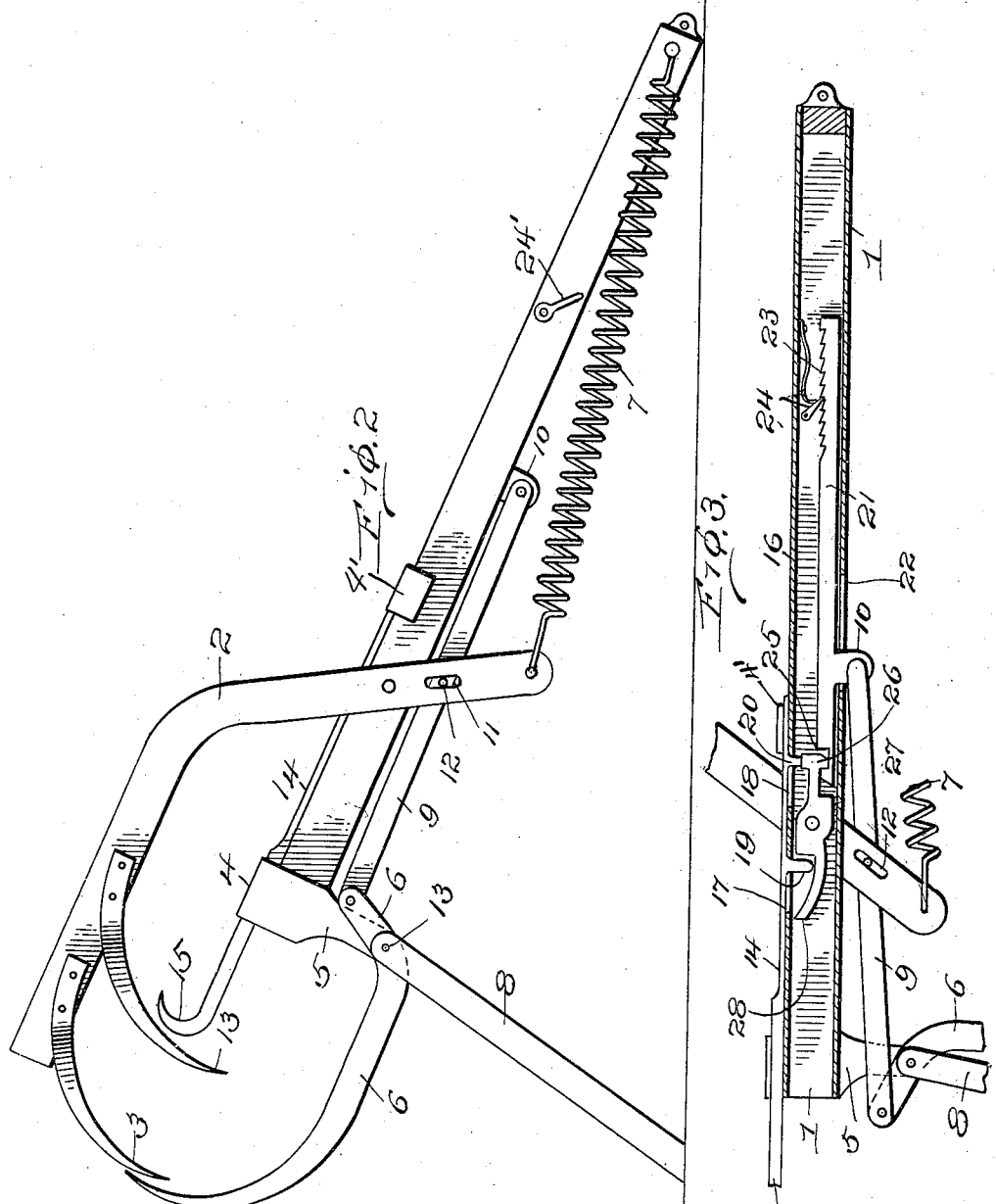

JOHN DRUBKO, OF WILLOW RIVER, MINNESOTA.

ANIMAL-TRAP.

981,592.     Specification of Letters Patent.     Patented Jan. 10, 1911.

Application filed April 26, 1910. Serial No. 557,731.

*To all whom it may concern:*

Be it known that I, JOHN DRUBKO, a citizen of the United States, residing at Willow River, in the county of Pine and State of Minnesota, have invented certain new and useful Improvements in Animal-Traps, of which the following is a specification.

My invention has relation to improvements in animal traps and the main object thereof is to produce such a device as will be efficient in operation, simple in construction and inexpensive to manufacture.

With the foregoing and other objects in view my invention consists of the novel construction and arrangement of parts as are described in this specification, illustrated in the accompanying drawings forming a part thereof and particularly pointed out in the appended claims.

Referring more particularly to the drawings: Figure 1 is a side elevation of my improved trap, being in open position. Fig. 2 is a side elevational view thereof, being in closed or sprung position. Fig. 3 is a longitudinal, transverse section of my device, in open position, parts being broken away.

Referring more particularly to the drawings in which like numerals designate like parts throughout, my invention, in detail, is described as follows:

The main or body portion 1 has pivotally held thereto the lever or arm 2 carrying the hooks 3. Secured to the forward end of said body 1 by means of a collar 4 provided with an ear 5 is a hook 6, which hook is actuated by means of the action of said arm or lever 2, which lever is in turn actuated by means of the coil or helical spring 7. An adjustable brace or support 8 is also pivotally held to said ear 5. The means whereby said hook 6 is actuated by said arm 2 consists in a rod 9 pivotally connected to the inner end of said hook 6, the other end of said rod pivotally held to a lug 10. A second lug 11 is formed integral with said rod 9, said lug 11 passing through an elongated perforation 12 near the inner end of said lever 2. Thus when said spring 7 draws the lever 2 rearward, said arm 9 will also be drawn rearward, which action actuates said hook on its pivot 13. The body portion 1 of said trap is hollow as clearly shown in Fig. 3.

The trap comprises a small rod 14 provided with a small hook 15 formed at its forward end. Said rod 14 runs longitudinally with and rests against the outer face 16 of said body portion and is guided by said collar 4 and suitable guiding means 4'. Formed integral with said rod 14 and projecting through corresponding longitudinal slots 17 and 18 are the inwardly extending lugs 19 and 20, respectively. A bar 21 is within the hollow body portion 1, said bar 21 being provided with the lug 10 integral therewith, which lug works in a longitudinal slot 22 in one of the side walls of said body portion. Said bar is provided with a plurality of teeth 23, which teeth are engaged by a spring pressed pawl 24 a latch 24' is arranged without the body portion 1 and is connected to the spindle upon which said pawl 24 rotates, said latch being provided for the operation of the disengagement of the pawl from the teeth 23, when desired. The bar is provided near its forward end with a notch 25, which notch is engaged by the head 26 of the latch 27, which is pivotally held within the hollow body portion 1. Said latch is further provided with a curved extension 28, which extension is adapted to be contacted by said lug 19, when the rod 14 is drawn forward. When said rod is drawn forward the lug 20 no longer holds the head 26 of said latch 27 in engagement with said notch 25. Thus it is clear that when said lug 19 plays against the extension 28 the latch will be thrown out of engagement with said latch 25 and the trap will be immediately sprung by the force of said resilient means 27.

The object of the teeth 23 engaged by the pawl 24 is to prevent the trap from being pried open after it is sprung, which would allow the animal caught to escape.

Although I have described the construction of my invention yet I may exercise the right to make such changes therein as do not depart from the spirit of the invention and which fall within the scope of the appended claims.

Having described my invention, what I claim as new, is:

1. An animal trap comprising a body portion, a lever pivotally held thereto, hooks secured to the outer portion of the lever, a collar secured to the forward end of the body portion, an ear formed integral therewith, a hook pivotally held to the ear, resilient means to cause the operation of the snapping of the trap when sprung, said means consisting of a spring one end of which is secured to the inner end of the lever, the other end thereof secured to the body portion, and means to spring the trap, substantially as shown and described.

2. An animal trap comprising a body portion, a lever pivotally held thereto, hooks, means of connection between the hooks and the body portion, said means comprising said lever and a collar provided at the outer end of the body portion of the trap, resilient means to cause the snapping of the trap when sprung, which means is interposed between the inner ends of the lever and a suitable point of the body portion of the trap, and means to spring the trap consisting of a bait hook, a rod, a bar provided with a notch, a latch provided with a head, the head of the latch engaging a notch of said bar when the trap is in open position, the head of the latch when disengaged from said notch allowing the trap to spring into closed position, an inwardly extending lug adapted to trip the latch when said bait hook is drawn downward, said lug coming into contact with a curved lower extension of said latch.

3. An animal trap comprising a body portion, a lever pivotally held thereto, hooks secured to the outer portion of the lever, a collar secured to the forward end of the body portion, an ear formed integral therewith, a hook pivotally held to the ear, a support for the trap also pivotally held to the ear, resilient means to cause the operation of the snapping of the trap when sprung, said means consisting of a coil spring one end of which is secured to the inner end of the lever, the other end being secured to the body portion at a suitable point, and means to spring the trap comprising a bait hook and a rod running longitudinally with the body portion.

4. An animal trap comprising a body portion, a lever pivotally held thereto, hooks, means of connection between the hooks and the body portion, resilient means to cause the snapping of the trap when sprung and means to spring the trap comprising a bait hook, a rod, a bar provided with a notch, a latch provided with a head, the head of the latch engaging the notch of said bar when the trap is in open position.

In testimony whereof I affix my signature, in presence of two witnesses.

JOHN DRUBKO.

Witnesses:
A. A. UPGREN,
F. THILLMANN.